United States Patent
Hutton

[19]

[11] Patent Number: 6,036,008
[45] Date of Patent: Mar. 14, 2000

[54] COMPACT DISC STORAGE DEVICE

[76] Inventor: David L. Hutton, 4350 Brecksville Rd., Richfield, Ohio 44286

[21] Appl. No.: 09/044,454

[22] Filed: Mar. 19, 1998

Related U.S. Application Data

[60] Provisional application No. 60/039,895, Mar. 19, 1997.

[51] Int. Cl.[7] .................................................. B65D 85/57
[52] U.S. Cl. .................. 206/303; 206/308.1; 15/DIG. 14
[58] Field of Search .................................. 206/303, 307, 206/308.1, 309, 312, 449; 312/9.16, 9.17, 9.48; 15/97.1, DIG. 14

[56] References Cited

U.S. PATENT DOCUMENTS

| | | | |
|---|---|---|---|
| 3,730,602 | 5/1973 | Campbell et al. | 206/309 |
| 4,702,533 | 10/1987 | Seifert | 206/308.1 |
| 4,728,157 | 3/1988 | David, Jr. . | |
| 5,000,316 | 3/1991 | Lerner . | |
| 5,038,932 | 8/1991 | Sheu . | |
| 5,265,721 | 11/1993 | Castritis . | |
| 5,310,053 | 5/1994 | Lowry et al. . | |
| 5,379,890 | 1/1995 | Mahler . | |
| 5,450,953 | 9/1995 | Reisman . | |
| 5,495,939 | 3/1996 | Castritis . | |
| 5,511,659 | 4/1996 | Bosworth . | |
| 5,590,768 | 1/1997 | Hilton et al. . | |
| 5,593,031 | 1/1997 | Uchida . | |
| 5,641,063 | 6/1997 | Gambardella et al. | 206/308.1 |
| 5,704,474 | 1/1998 | Oland | 206/308.1 |

Primary Examiner—Jim Foster
Attorney, Agent, or Firm—Fay, Sharpe, Fagan, Minnich & McKee, LLP

[57] ABSTRACT

A disk storage device includes a first housing portion including a planar upper wall spaced-apart from a planar lower wall, a first side wall connecting mutual first edges of the upper and lower walls together, a second side wall connecting mutual second edges of the upper and lower walls together, and a closed end wall connecting mutual end edges of the upper and lower walls together, the walls cooperating to define a disk holder portion having a front opening for receiving a planar object therein. The storage device also includes a second housing portion slidably receiving the first housing portion therein, the second housing portion including a planar upper wall spaced-apart from a planar lower wall, a first side wall connecting mutual first edges of the upper and lower walls together, and a second side wall connecting mutual second edges of the upper and lower walls together, the walls cooperating to define a disk case portion having a front opening for receiving an object and a rear opening for receiving the first housing portion, the lower wall and both side walls of the second housing portion extending rearwardly from the rear opening to support the first housing portion in a disk storage position. A biasing means such as a spring biases the first housing portion and the second housing portion apart in the disk storage position wherein the front opening of the first housing portion is proximate the rear opening of the second housing portion.

9 Claims, 5 Drawing Sheets

COMPACT DISC STORAGE DEVICE

CROSS REFERENCE TO RELATED APPLICATIONS

This application claims the benefit of U.S. Provisional Patent Application No. 60/039,895, filed Mar. 19, 1997.

BACKGROUND OF THE INVENTION

The present invention relates to storage devices for optical disks. It finds particular application in conjunction with storing compact disks and will be described with particular reference thereto. However, it should be appreciated that the present invention also finds application in conjunction with other storage devices and other applications which require only one hand to insert/eject an object from a storage device.

Compact disk playing devices are increasingly found in automotive vehicles. When a driver desires to listen to a compact disk, referred to hereafter as a CD, the driver must remove both hands from the steering wheel so as to pivotally open a conventional storage or "jewel" case, thereby gaining access to the CD. The driver must then grasp the CD in one hand and the jewel case in the other hand so as to remove the CD from a central retaining hub associated with the jewel case. The CD may then be inserted into a CD player typically mounted in a vehicle dashboard.

It is clearly dangerous for a driver to remove both hands from a steering wheel to remove a CD from a conventional jewel case and then insert the CD into an automotive CD player. Accordingly, it has been considered desirable to develop a new and improved compact disk storage device which meets the above-stated needs and overcomes the foregoing difficulties and others while providing better and more advantageous results.

SUMMARY OF THE INVENTION

In accordance with a first aspect of the present invention, a disk storage device is disclosed. The disk storage device includes an inner housing member for retaining a first portion of a disk therein, and an outer housing member for encompassing a second portion of a disk and at least a portion of said inner housing member, said inner housing member being telescopically slidable within said outer housing member to eject a disk from a forward opening in said outer housing member.

In accordance with a second aspect of the present invention, a disk storage device is disclosed. The disk storage device includes a first housing portion including a planar upper wall spaced-apart from a planar lower wall, a first side wall connecting mutual first edges of the upper and lower walls together, a second side wall connecting mutual second edges of the upper and lower walls together, and a closed end wall connecting mutual end edges of the upper and lower walls together, the walls cooperating to define a disk holder portion having a front opening for receiving a planar object therein. A second housing portion slidably receives the first housing portion therein, the second housing portion includes a planar upper wall spaced-apart from a planar lower wall, a first side wall connecting mutual first edges of the upper and lower walls together, and a second side wall connecting mutual second edges of the upper and lower walls together, the walls cooperating to define a disk case portion having a front opening for receiving an object and a rear opening for receiving the first housing portion, the lower wall and both side walls of the second housing portion extending rearwardly from the rear opening to support the first housing portion in a disk storage position. A spring means biases the first housing portion and the second housing portion in the disk storage position wherein the front opening of the first housing portion is proximate the rear opening of the second housing portion.

In accordance with a third aspect of the invention, a method of ejecting a disk from a storage device is disclosed. The storage device has an inner housing member for retaining a first portion of the disk therein, and an outer housing member for encompassing a second portion of a disk and at least a portion of the inner housing member. The inner housing member is telescopically slidable within the outer housing member. The method includes urging the inner and outer housing portions together to reduce the length of the storage device and eject the disk from a forward opening defined in the outer housing portion.

One advantage of the present invention is that it permits a user to use only one hand to eject a disk from or insert a disk into the disk storage device.

Another advantage of the present invention is that it removes lint, dust, etc. from a disk when the disk is ejected from and inserted into the disk storage device.

Another advantage of the present is that it permits a disk to be ejected from or inserted into the disk storage device without a user contacting the disk.

Another advantage of the present invention is that it provides a simple two-piece construction which eliminates the need for a mechanical hinge or pivot associated with conventional jewel cases.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENTS

Figure 1:
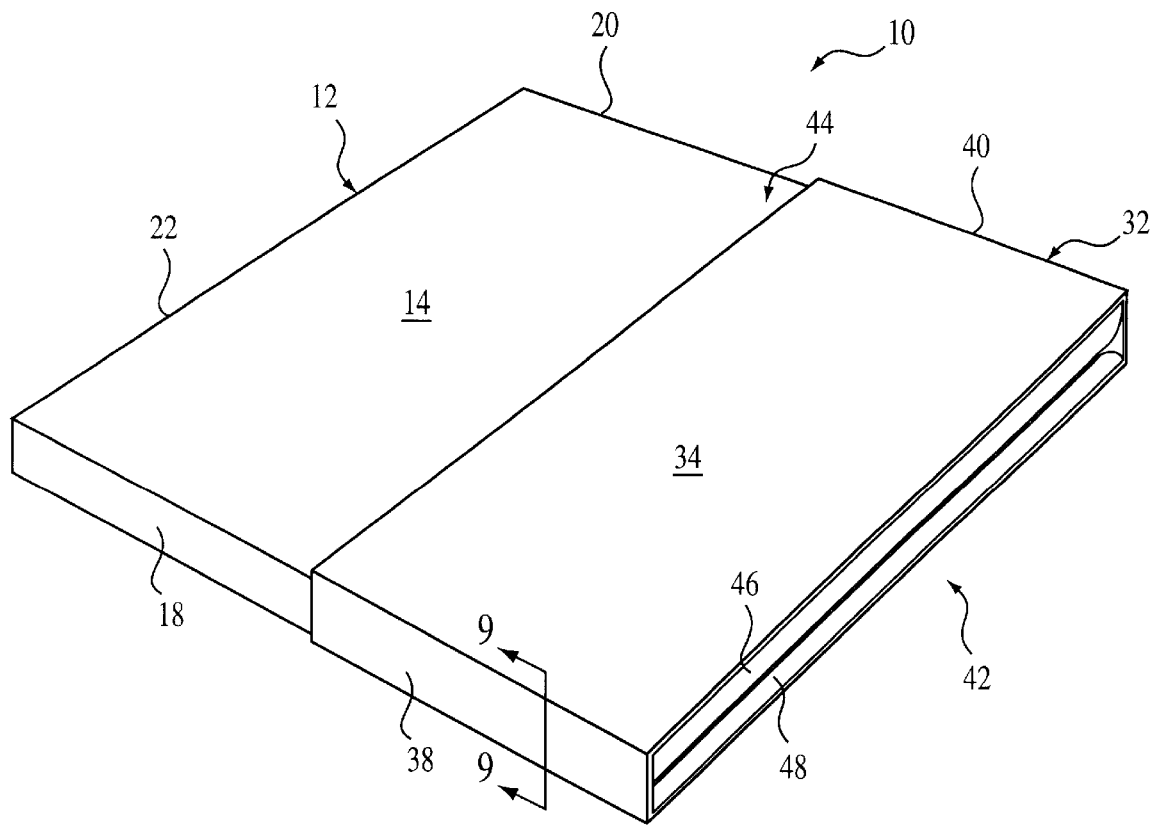
FIG. 1 is a perspective view of a compact disk storage device which incorporates the features of the present invention therein.
Figure 4:
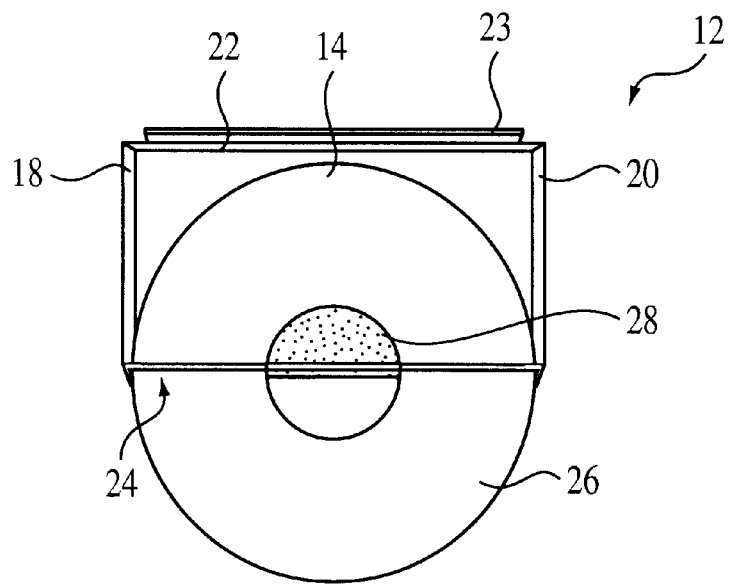
FIG. 4 is a top view of a first housing portion of the compact disk storage device which defines a disk holder.

With reference to FIGS. 1 and 4, a compact disk storage device 10 includes a first housing portion 12 having a planar upper wall 14 which is spaced-apart from a planar lower wall 16. A first side wall 18 connects mutual first edges of the upper and lower walls together. A second side wall 20 connects mutual second edges of the upper and lower walls together. A closed end wall 22 connects mutual end edges of the upper and lower walls together. A gripping member 23 protrudes from the rear wall 22 so as to facilitate moving the first housing portion as described further below. The walls 14–22 cooperate to define a disk holder portion having a front opening 24 for receiving a compact disk, video disk, or the like 26.

Figure 2:
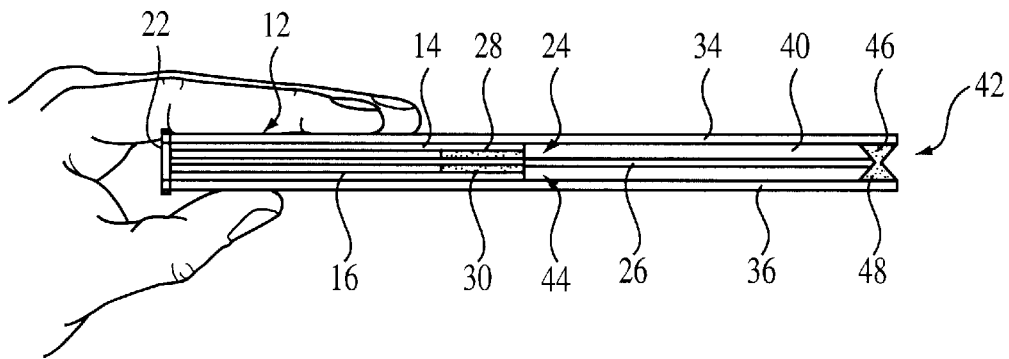
FIG. 2 is a longitudinal cross section view of the compact disk storage device shown in a disk retracted position.
Figure 3:
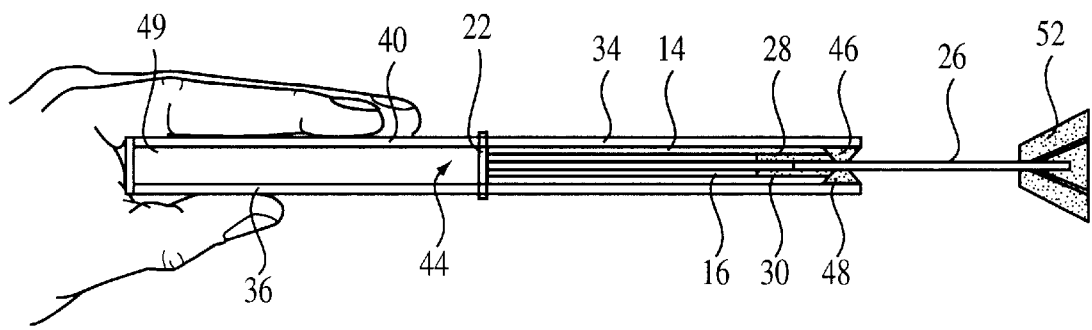
FIG. 3 is a longitudinal cross section view of the compact disk storage device shown in a disk extended position.

As shown in FIGS. 2 and 3, a first holder/cleaner is positioned adjacent the front opening 24. The first holder/cleaner includes an upper pad of resilient material 28 secured to an inner surface of the upper wall and a lower pad of resilient material 30 secured an inner surface of the lower wall. The mutually opposing pads are spaced-apart so as to frictionally contact a disk that is inserted into the disk holder portion. The pads 28, 30 cooperate to substantially center the disk 26 between the walls 14, 16 thus protecting the disk from contacting the walls defining the first housing portion. It should be appreciated that an additional pad of resilient material may be secured to the inner surface of the wall 22 so as to prevent a circumferential end edge of the disk from directly contacting the wall 22.

The compact disk storage device 10 also includes a second housing portion 32 which slidably receives the first housing portion 12 therein when receiving or ejecting a disk 26. In particular, the first housing portion and the second housing portion telescopically cooperate when inserting and ejecting a disk. The second housing portion 32 includes a planar upper wall 34 which is spaced-apart from a planar lower wall 36. A first side wall 38 connects mutual first edges of the upper and lower walls together. A second side wall 40 connects mutual second edges of the upper and lower walls together.

The walls 34–40 cooperate to define a disk case portion having a front opening 42 for receiving a compact disk, video disk, or the like 26, and a rear opening 44 for receiving the first housing portion 12. The lower wall 36 and both side walls 38, 40 of the second housing portion may extend rearwardly from the rear opening 44 to support the first housing portion 12 in the disk storage position. In the disk storage position, the combined length of the first and second housing portions 12, 32 is sufficient to completely accommodate a disk therein.

A second holder/cleaner is positioned adjacent the front opening 42. The second holder/cleaner includes an upper pad of resilient material 46 secured to an inner surface of the upper wall, and a lower pad of resilient material 48 secured an inner surface of the lower wall. The mutually opposing pads 46, 48 are spaced apart so as to frictionally contact a disk that is inserted into the front opening. In addition, the pads 46, 48 extend along the width of the upper and lower walls from approximately the first side wall 38 to approximately the second side wall 40 thereby preventing dust and debris from entering the disk storage device.

The side walls 38, 40 of the second housing portion are higher than the side walls 18, 20 of the first housing portion. The upper and lower walls 34, 36 of the second housing portion are wider than the upper and lower walls 14, 16 of the first housing portion so that the second housing portion 32 can slidably accommodate the first housing portion 12 therein.

Figure 5:
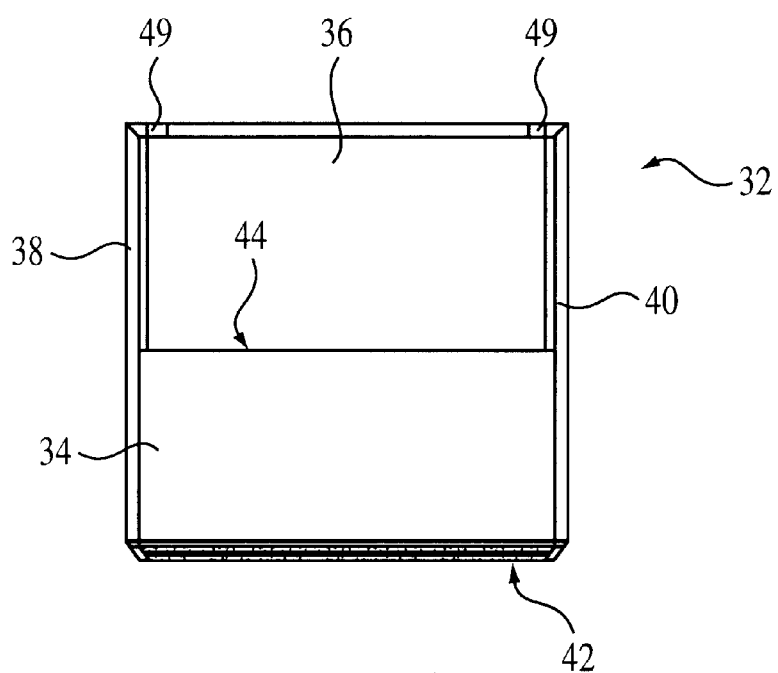
FIG. 5 is a top view of a second housing portion of the compact disk storage device which defines a disk case.
Figure 6:
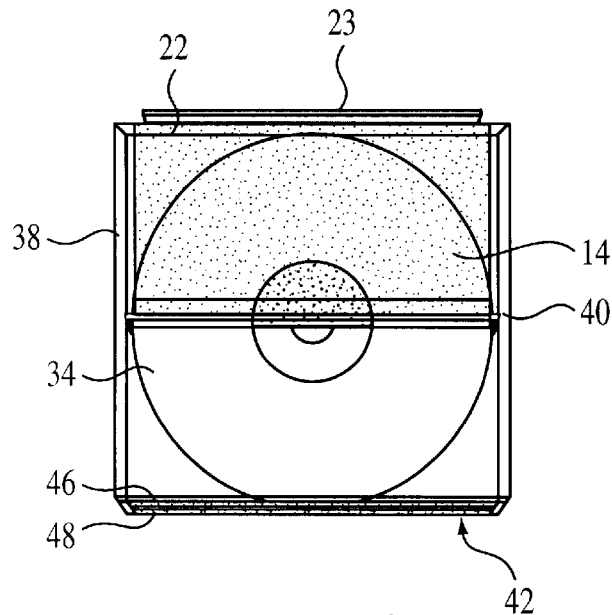
FIG. 6 is a top view of the first housing portion and the second housing portion cooperating to define the compact disk storage device in the disk retracted position.

In a disk storage position, as shown in FIGS. 1, 2, and 6, the first housing portion 12 may be rearwardly spring-biased so that the first housing portion opening 24 is positioned within and proximate the rear opening 44 of the second housing portion 32. A retainer mechanism may prevent the first housing portion 12 from separating from the second housing portion 32. In the embodiment being described, the retainer mechanism may include mutually opposing flanges 49(FIGS. 5 and 7) extending transversely from the end edges of the side walls 38, 40. The flanges 49 prevent the first housing portion 12 from separating from the second housing portion 32. The retainer may also include or alternatively include a locking member 50 having opposed locking members associated with each of the side walls 18, 38 as shown in FIG. 8.

Figure 7:
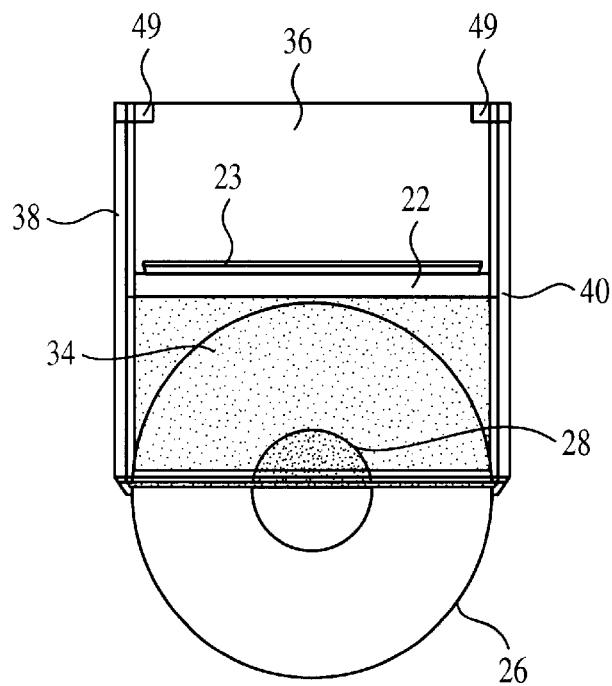
FIG. 7 is a top view of the first housing portion and the second housing portion cooperating to define the compact disk storage device in the disk extended position.
Figure 8:
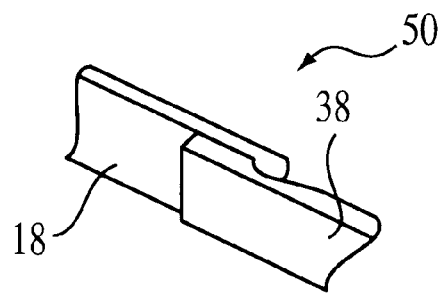
FIG. 8 is a perspective view of a locking member defined in the side walls of the first housing portion and the second housing portion.

As shown in FIGS. 3 and 7, to eject a disk 26 stored in the storage device 10, a user manually urges the first housing portion 12 forward until the first housing opening 24 is proximate the front opening 42 of the second housing portion. The first housing portion may be urged forward by grasping the gripper member 23. In addition, the first housing portion may be urged forward against a spring bias force. A load mechanism 52 (FIG. 3) associated with an automotive CD player may then grasp the protruding disk 26 for automatic insertion into the CD player without the user contacting the disk. It should be appreciated that as the disk is ejected from the front opening 42, the pads 28, 30, 46, and 48 frictionally contact both sides of the disk 26, thereby removing dust, lint, etc. from the disk.

Likewise, to insert a compact disk into the disk storage device 10, the user manually urges the first housing portion 12 forward, again using the gripper member 23, if desired, and alternatively against a spring bias force, until the first housing opening 24 is proximate the front opening 42 of the second housing portion. The disk storage device 10 is then urged over the disk protruding the from the load mechanism 52 until the disk passes through both front openings 24, 42 and contacts or is positioned proximate the rear wall 22 associated with the first housing portion 12.

The user then urges the first housing portion rearwardly by pulling on the gripper member 23. Alternatively, the user may release the first housing portion 12 whereby the first housing portion 12 is urged rearwardly by the spring bias force until the front opening 24 is proximate the rear opening 44. It should be appreciated that as the disk is inserted into the front openings 24, 42, the pads 28, 30, 46, and 48 frictionally contact both sides of the disk 26, thereby removing dust, lint, etc. from the disk.

Figure 9:
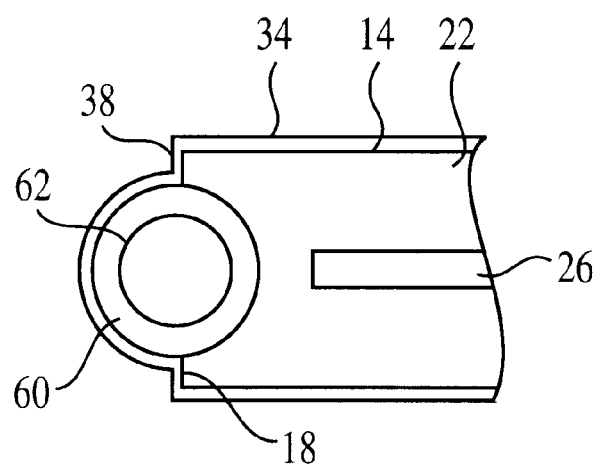
FIG. 9 is a partial cross section view through the first housing portion taken along the line 9—9 of FIG. 1, showing an exemplary bias means for urging the second housing portion away from the first housing portion.

Referring now to FIG. 9, there is shown an exemplary bias means for urging the first and second housing portions 12, 32 apart to completely encompass the disk 26 in a stored position. In particular, the first housing portion 12 can include a transverse pad 60 extending from a front edge of each side wall 18, 20. Likewise, the second housing portion 32 can include a similar transverse pad extending from a front edge of each side wall 38, 40. In addition, the side walls 38, 40 can conform to the shape of the transverse pad (i.e., arcuate). A bias means 62, such as a compressed spring or the like, may be interposed between the transverse pads to urge the housing portions 12, 32 apart.

To eject a disk, the housing portion 12 may be urged within the housing portion 32 by compressing further the bias means 62. When the urging force is removed, the bias means again urges the housing portions apart. It should be appreciated that numerous different mechanisms may be employed as the bias means 62 without departing from the spirit and scope of the invention.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. A disk storage device comprising:

an inner housing member for retaining a first portion of a disk therein;

an outer housing member for encompassing a second portion of a disk and at least a portion of said inner housing member, said inner housing member being telescopically slidable within said outer housing member to eject a disk from a forward opening in said outer housing member; and means for biasing said inner housing member away from said outer housing member to completely emcompass a disk retained by said inner housing member, said inner housing member being urged within said outer housing member against said biasing means to eject a disk from said outer housing member.

2. The device of claim 1, wherein said inner housing member includes at least one pad of resilient material secured to an inner surface of said inner housing member to frictionally contact a disk.

3. The device of claim 1, wherein said outer housing member includes at least one pad of resilient material secured to an inner surface of said outer housing member to frictionally contact a disk.

4. A disk storage device comprising:

a first housing portion including a planar upper wall spaced-apart from a planar lower wall, a first side wall connecting mutual first edges of the upper and lower walls together, a second side wall connecting mutual second edges of the upper and lower walls together, and a closed end wall connecting mutual end edges of the upper and lower walls together, the walls cooperating to define a disk holder portion having a front opening for receiving a planar object therein;

a second housing portion slidably receiving the first housing portion therein, the second housing portion including a planar upper wall spaced-apart from a planar lower wall, a first side wall connecting mutual first edges of the upper and lower walls together, and a second side wall connecting mutual second edges of the upper and lower walls together, the walls cooperating to define a disk case portion having a front opening for receiving an object and a rear opening for receiving the first housing portion, the lower wall and both side walls of the second housing portion extending rearwardly from the rear opening to support the first housing portion in a disk storage position.

5. The device of claim 4, further including spring means for biasing the first housing portion and the second housing portion in the disk storage position wherein the front opening of the first housing portion is proximate the rear opening of the second housing portion.

6. The device of claim 4, wherein said first housing portion includes at least one pad of resilient material secured to an inner surface of said first housing portion to frictionally contact a disk.

7. The device of claim 6, wherein said second housing portion includes at least one pad of resilient material secured to an inner surface of said second housing portion to frictionally contact the disk.

8. A method of ejecting a disk from a storage device having an inner housing member for retaining a first portion of the disk therein, and an outer housing member for encompassing a second portion of a disk and at least a portion of said inner housing member, said inner housing member being telescopically slidable within said outer housing member, the method comprising:

urging the inner and outer housing portions together to reduce the length of the storage device and eject the disk from a forward opening defined in the outer housing portion.

9. The method of claim 8, wherein the urging step includes:

urging the inner and outer housing portions together against a biasing force to reduce the length of the storage device and eject the disk from the forward opening defined in the outer housing portion.

* * * * *